United States Patent [19]

Garapon et al.

[11] Patent Number: 5,112,937
[45] Date of Patent: May 12, 1992

[54] POLYMERS DERIVED FROM UNSATURATED POLYESTERS BY ADDITION OF COMPOUNDS WITH A THIOL FUNCTION AND THEIR USE AS ADDITIVES MODIFYING THE PROPERTIES OF PETROLEUM MIDDLE DISTILLATES WHEN COLD

[75] Inventors: Jacques Garapon, Lyons; Rémi Touet, Saint-Egreve; Bernard Damin, Oullins; Béatrice Debled, Villeurbanne, all of France

[73] Assignees: Institut Francai du Petrole, Rüeil-Malmaison; Elf France, Courbevoie, both of France

[21] Appl. No.: 698,023

[22] Filed: May 10, 1991

Related U.S. Application Data

[62] Division of Ser. No. 306,174, Feb. 6, 1989, Pat. No. 5,037,945.

[30] Foreign Application Priority Data

Feb. 4, 1988 [FR] France ................. 88/01424

[51] Int. Cl.⁵ ................................ C08G 63/688
[52] U.S. Cl. ................. 528/272; 528/293; 528/296; 528/297; 528/299; 528/303; 528/306; 528/374; 528/376; 44/300; 44/390; 44/386
[58] Field of Search ............ 528/272, 293, 299, 296, 528/297, 303, 306, 374, 376; 44/300, 66, 76

[56] References Cited

U.S. PATENT DOCUMENTS

| | | | |
|---|---|---|---|
| 3,382,055 | 5/1968 | Jacobson et al. | 44/62 |
| 3,790,358 | 2/1974 | Rossi et al. | 44/62 |
| 3,959,103 | 5/1976 | Larsen | 204/159.19 |
| 4,135,887 | 1/1979 | Rossi | 44/62 |
| 4,390,688 | 6/1983 | Walz et al. | 528/295.3 |
| 4,776,969 | 10/1988 | Ryer et al. | 252/46.7 |

*Primary Examiner*—John Kight, III
*Assistant Examiner*—Sam A. Acquah
*Attorney, Agent, or Firm*—Millen, White & Zelano

[57] ABSTRACT

Disclosed are polymers of average molecular weight ranging from 400 to 20,000 comprising thiosubstituted groups per molecule and resulting from the reaction, in the presence of an addition catalyst, of at least one compound with a thiol function, having 1 to 60 carbon atoms per molecule, with an unsaturated polyester resulting from the condensation of an aliphatic epoxide with an unsaturated aliphatic dicarboxylic compound comprising at least one ethylenic unsaturation in the alpha position of one of the carboxyl groups. Also disclosed are middle distillate compositions having a distillation range from 150° to 450° C. and comprising a minor proportion, preferably from 0.001 to 2% by weight, of at least one of the polymers defined hereinabove.

15 Claims, No Drawings

POLYMERS DERIVED FROM UNSATURATED POLYESTERS BY ADDITION OF COMPOUNDS WITH A THIOL FUNCTION AND THEIR USE AS ADDITIVES MODIFYING THE PROPERTIES OF PETROLEUM MIDDLE DISTILLATES WHEN COLD

This is a division of application Ser. No. 07/306,174 filed Feb. 6, 1989, now U.S. Pat. No. 5,037,945.

The present invention concerns modified polymers comprising thiosubstituted side groups derived from compounds comprising a thiol function.

The polymers of the present invention can be particularly used as additives allowing improvement of the flow properties of petroleum middle distillates (fuels and gas oils) when cold.

The modified polymers of the present invention result from the reaction of at least one compound with a thiol function, having one of the general formulae (I) or (II) described hereinafter, with a condensation polymer (unsaturated polyester) resulting from the condensation of at least one aliphatic epoxide (hereinafter called epoxidated compound) with at least one unsaturated aliphatic dicarboxylic compound, comprising at least one ethylenic unsaturation in the alpha position of one of the carboxyl groups (hereinafter called dicarboxylic compound) and usually having 4 to 60 carbon atoms, preferably 4 to 30 carbon atoms and most often 4 to 8 carbon atoms per molecule.

The condensation polymers resulting from condensation of at least one monoepoxidated compound with at least one dicarboxylic compound are compounds described in previous works and some are known to be additives having an effect on the flow point of crude oil and fuel-oils (U.S. Pat. No. 4,135,887).

It has surprisingly been discovered that the modified polymers of the present invention are additives that lead to greater improvement of the flow properties of cold hydrocarbon middle distillates in comparison with most of the additives cited in previous works.

The condensation polymers used to prepare the modified polymers of the present invention are obtained by conventional methods for preparation of condensation polymers known to professionals in the field.

The dicarboxylic compound used in the present invention is usually preferably a mono-unsaturated compound having 4 to 8 carbon atoms per molecule, for example, maleic acid, fumaric acid, itaconic acid, citraconic acid and mesaconic acid.

The dicarboxylic compound is preferably a mono-unsaturated cyclic anhydride such as maleic anhydride, alkylmaleic anhydrides and alkenyl-succinic anhydrides.

Within the scope of the invention, preferred anhydrides are maleic anhydride, citraconic (methylmaleic) anhydride and itaconic (methylene-succinic) anhydride.

The epoxidated compound used within the scope of the present invention is a compound usually having 2 to 62 carbon atoms, preferably 2 to 40 carbon atoms, most often 6 to 40 carbon atoms and advantageously 8 to 40 carbon atoms in its molecule.

Within the scope of the present invention, monoepoxidated compounds or mixtures of epoxidated compounds preferably comprising a proportion of at least 50% in mole of monoepoxidated compounds and containing compounds including several epoxide groups in their molecule, for example, two or three epoxide groups are preferably used. The molar proportion of these compounds, called polyepoxidated compounds, in the mixture of epoxidated compounds is usually less than 50%, preferably less than 40% and more advantageously less than 30%. The aliphatic epoxidated compounds used in the present invention usually have the following general formula:

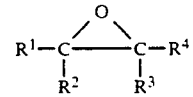

in which $R^1$ and $R^3$, identical or different, each represent a hydrogen atom or a lower alkyl group having, for example, 1 to 4 carbon atoms, such as methyl, ethyl, propyls and butyls; $R^2$ and $R^4$ each represent a hydrogen atom, an alkyl group, preferably substantially linear, having 1 to 60 carbon atoms, preferably 1 to 38 carbon atoms and more particularly 4 to 38 carbon atoms, an alkoxyalkyl group of formula $R^5-O-R^6-$ in which $R^5$ represents an alkyl group, preferably substantially linear, having 1 to 59 carbon atoms, preferably 1 to 37 carbon atoms and more particularly 1 to 25 carbon atoms and $R^6$ represents an alkylene group, preferably substantially linear, having 1 to 59 carbon atoms, preferably 1 to 37 carbon atoms, the sum of the carbon atoms of $R^5$ and $R^6$ usually being from 2 to 60, preferably from 2 to 38 and more particularly from 4 to 38.

In the formula of the monoepoxidated compound, described hereinabove, $R^2$ can also represent an alkoxycarbonylalkylene group of formula

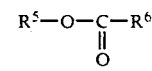

or an alkylcarbonyloxyalkylene group of formula

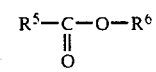

in which $R^5$ and $R^6$ are as defined hereinabove. The preferred monoepoxidated compounds are those in which $R^1$ and $R^3$ each represent a hydrogen atom, as well as those in which $R^1$, $R^3$ and $R^4$ each represent a hydrogen atom.

The following can be cited as examples of preferred monoepoxidated compounds: compounds in which $R^1$, $R^3$ and $R^4$ each represent a hydrogen atom and in which $R^2$ represents a substantially linear alkyl group having 6 to 38 carbon atoms; a substantially linear alkoxyalkyl group of formula $R^5-O-R^6$, a substantially linear alkoxycarbonylalkylene group of formula

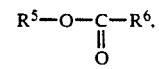

a substantially linear alkylcarbonyloxyalkylene of formula

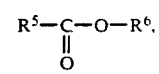

in which $R^5$ represents a substantially linear alkyl group having 1 to 37 carbon atoms and preferably 1 to 25 carbon atoms and $R^6$ represents a substantially linear alkylene group having 1 to 37 carbon atoms and preferably 5 to 37 carbon atoms in the case of an alkoxycarbonylalkylene group, the sum of the carbon atoms of $R^5$ and $R^6$ preferably being from 6 to 38.

Examples of preferred monoepoxidated compounds, are compounds in which $R^1$ and $R^3$ each represent a hydrogen atom and $R^2$ and $R^4$, identical or different, each represent a hydrogen atom or a substantially linear alkyl group having 1 to 60 carbon atoms, preferably 1 to 38 carbon atoms (substantially linear monoepoxyalkane), as well as compounds in which $R^4$ represents a hydrogen atom or a substantially linear alkyl group, as defined hereinabove, and $R^2$ represents an alkoxycarbonylalkylene as defined hereinabove.

The following can be cited as specific examples of aliphatic monoepoxidated compounds: ethylene oxide, propylene epoxide, 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytetradecane, 1,2-epoxypentadecane, 1,2-epoxyhexadecane, 1,2-epoxyoctadecane, 1,2-epoxynonadecane, 1,2-epoxyeicosane, 1,2-epoxydocosane, 1,2-epoxytetracosane, 1,2-epoxyhexacosane, epoxidated polybutanes of average molecular weight (Mn) between about 100 and about 1000, 2,3-epoxybutane, 2,3-epoxypentane, 2,3-epoxyhexane, 3,4-epoxyheptane, 2,3-epoxyocatane, 3,4-epoxyoctane, 3,4-epoxydecane, 9,10-epoxyoctadecane, 3-ethoxy-1,2-epoxypropane, 3-propoxy-1,2-epoxypropane, 3-butoxy-1,2-epoxypropane, 3-pentyloxy-1,2-epoxypropane, 3-hexyloxy-1,2-epoxypropane, 3-heptyloxy-1,2-epoxypropane, 3-octyloxy-1,2-epoxypropane, 3-decyloxy-1,2-epoxypropane, 3-dodecyloxy-1,2-epoxypropane, 1-acetoxy-2,3-epoxypropane, 1-butyroloxy-2,3-epoxypropane, 1-lauroyloxy-2,3-epoxypropane, 3-myristoyloxy-1,2-epoxypropane, 3-palmityoyloxy-1,2-epoxypropane, 3-stearoyloxy-1,2-epoxypropane, alkyl esters, for example methyl, ethyl, propyl, butyl, 2-ethylhexyl and hexadecyl esters of 3,4-epoxybutanoic acid, 4,5-epoxypentanoic acid, 3,4-epoxynonanoic acid, 10,11-epoxyundecanoic acid, 6,7-epoxyoctadecanoic acid, 12,13-epoxyoctadecanoic acid, 11,12-epoxyoctadecanoic acid, 9,10-epoxyoctadecanoic acid, 11,12-epoxyeicosanoic acid and 13,14-epoxydocosanoic acid.

The following can be cited as specific examples of mixtures of epoxidated compounds comprising polyepoxides: alkyl ester mixtures obtained by esterification of a mixture of epoxy-acids resulting from epoxidation of a mixture of fatty acids with ethylenic unsaturations.

The mixture of fatty acids with ethylenic unsaturations is, for example, a mixture comprising, in the approximate weight proportions given in table I hereinafter, acids having 12 to 20 carbon atoms in their molecule and containing saturated and unsaturated acids. This mixture is usually called olein.

acids comprising 3 ethylenic unsaturations (p is the number of carbon atoms).

The unsaturated polyester is usually obtained by reacting at least one dicarboxylic compound (as defined hereinabove) with at least one epoxidated compound (as defined hereinabove) in the presence of a condensation catalyst, for example, a strong acid or a titanium salt, for example, an alkyl titanate, n-butyl titanate in particular.

Condensation between at least one dicarboxylic compound and at least one epoxidated compound can be carried out in the presence or absence of a solvent. For example, a hydrocarbon solvent such as benzene, hexane, cyclohexane, toluene, xylene or a mixture of hydrocarbons, for example, a hydrocarbon cut with a high boiling point such as a kerosene or a gas oil can be used.

The condensation reaction is usually carried out at a temperature from about 30° to 200° C., and preferably from about 50° to 160° C., for about 30 minutes to 30 hours, and preferably for about 2 hours to 15 hours.

Condensation between the dicarboxylic compound and the epoxidated compound is carried out using quantities of each of these compounds such that the epoxidated compound/dicarboxylic compound molar ratio is usually from about 0.4:1 to 1.8:1, preferably from about 0.8:1 to 1.2:1 and more particularly from about 0.9:1 to 1.1:1.

The unsaturated polyester obtained in this way is then reacted with at least one compound with a thiol function as defined hereinafter. The reaction is usually carried out in the presence of a solvent which can be identical or different to that used in the unsaturated polyester preparation step.

When the solvent used in this addition reaction of the compound with a thiol function is the same as that used during formation of the polyester, it is possible to not isolate the polyester and to carry out the reaction on the raw polycondensation product, possibly after having removed the catalyst used in the polycondensation. When the polycondensation has been carried out without using a solvent, the polyester is preferably first dissolved in a quantity of solvent, usually representing in weight the weight of the polyester formed, then the addition reaction is carried out with the compound with a thiol function.

The compounds with a thiol function used usually have one of the following general formulae:

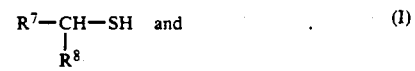

$$R^7-\underset{R^8}{CH}-SH \quad \text{and} \quad \text{(I)}$$

$$HS-CH_2+R^9\!\!\rightarrow_{\overline{n}} COOR^{10} \quad \text{(II)}$$

in which $R^7$ represents a hydrogen atom or an alkyl group, preferably substantially linear, having 1 to 59 carbon atoms, preferably 4 to 29 carbon atoms and most often 5 to 24 carbon atoms, $R^8$ represents a hydrogen atom or a lower alkyl group having, for example, 1 to 4

TABLE I

| ACIDS | $C_{12}$ | $C_{14}$ | $C_{14.1}$ | $C_{15}$ | $C_{16}$ | $C_{16.1}$ | $C_{17.1}$ | $C_{18}$ | $C_{18.1}$ | $C_{18.2}$ | $C_{18.3}$ | $C_{20.1}$ |
|---|---|---|---|---|---|---|---|---|---|---|---|---|
| % Weight | 0.8 | 2.7 | 1.0 | 0.5 | 5.0 | 5.5 | 1.5 | 1.5 | 68.0 | 10.0 | 2.5 | 1.0 |

*saturated acids

In table I hereinabove, $C_{p.1}$ designates acids comprising one ethylenic unsaturation, $C_{p.2}$ designates acids comprising 2 ethylenic unsaturations and $C_{p.3}$ designates carbon atoms and preferably a hydrogen atom or a methyl or ethyl group, $R^9$ represents an alkylene group, preferably substantially linear, having 1 to 57 carbon atoms and preferably 1 to 27 carbon atoms, n is zero or one and $R^{10}$ represents an alkyl group, preferably substantially linear, having 1 to 58 carbon atoms, preferably 1 to 28 carbon atoms and most often 1 to 24 carbon atoms.

The compounds with a thiol function usually used comprise 1 to 60 carbon atoms, preferably 5 to 30 carbon atoms and most often 6 to 25 carbon atoms in their molecule.

The compounds with a thiol function used within the scope of the present invention are preferably substantially linear alkylthiols having 5 to 30 carbon atoms, preferably 6 to 25 carbon atoms and advantageously 8 to 25 carbon atoms. These preferred compounds are of general formula (I), in which $R^8$ is a hydrogen atom, and are thus preferably linear, or general formula (II), in which $R^8$ is a methyl group, $R^7$ being in each case a linear alkyl group or a substantially linear alkyl group comprising, for example, one or more methyl and/or ethyl side groups.

The following can be cited as specific examples of compounds with a thiol group that can be used in the scope of the rpesent invention: methanethiol, ethanethiol, 1- or 2-propanethiol, 1-or 2-butanethiol, 1- or 2-pentanethiol, 1- or 2-hexanethiol, 1- or 2-heptanethiol, 1- or 2-octanethiol, 1- or 2-decanethiol, 1- or 2-dodecanethiol, 1- or 2-hexadecanethiol, 1- or 2-octadecanethiol, 1- or 2-tetradecanethiol, 1-or 2-eicosanethiol, 1- or 2-docosanethiol, 1-or 2-tetracosanethiol, 1- or 2-hexacosanethiol, 1- or 2-octacosanethiol, 2-methyl-1-propanethiol, 2-methyl-1-butanethiol, 3-methyl-1-butanethiol, 4-methyl-1-pentanethiol, 2-undecanethiol, 2-tridecanethiol, 2-pentadecanethiol, 2-heptadecanethiol, 2-nonadecanethiol, alkyl esters, for example methyl, ethyl, butyl, 2-ethylhexyl, hexadecylic and octadecylic esters of thioglycolic acid, 3-mercaptopropanoic acid, 4-mercaptobutanoic acid, 5-mercaptopentanoic acid and 6-mercaptohexanoic acid.

It should be understood that it is possible to use one or more compounds of general formula (I) and/or one or more compounds of general formula (II) as a compound with a thiol function.

The addition reaction of the compound with a thiol function to an unsaturated polyester is usually carried out in the presence of an addition catalyst, usually a basic catalyst, for example a tertiary amine. Triethylamine and triethylenediamine can be cited as examples of catalysts. The reaction is carried out by addition of the thiol compound to the unsaturated polyester dissolved in a solvent chosen, for example, from those mentioned hereinabove for the condensation reaction of the dicarboxylic compound with the epoxidated compound and heating at a temperature from about 25° to 200° C., preferably from 40° to 160° C., for example at about 60° C., the length of time necessary for the reaction to be substantially complete. The length of time of the reaction between the compound with a thiol function and the unsaturated polyester is usually from about 1 to 24 hours and most often from about 2 to 10 hours, for example, about 4 hours. The quantity of compound with a thiol function reacted is usually from about 0.2 to 1.5 mole, preferably from about 0.4 to 1.2 mole and preferably from about 0.5 to 1.1 mole per mole of dicarboxylic compound used in the formation of the unsaturated polyester. The quantity of compound with a thiol function is, for example, about 1 mole per mole of dicarboxylic compound.

The modified polymers of the present invention which can be advantageously used as additives in petroleum middle distillates are those comprising substantially linear side chains having at least 8 carbon atoms, preferably at least 10 carbon atoms and advantageously at least 12 carbon atoms, said chain possibly including oxygen and/or nitrogen atoms. These side chains can be provided by the epoxidated compound used in the preparation of the unsaturated polyester or the compound with a thiol function reacted with the unsaturated polyester, or provided by both the epoxidated compound and the compound with a thiol function.

The modified polymers according to the invention used as additives in petroleum middle distillates are preferably those which include side chains having at least 8 carbon atoms and advantageously at least 10 carbon atoms and most preferably at least 12 carbon atoms, provided by both the epoxidated compound used in the preparation of the unsaturated polyester and the compound with a thiol function reacted with the unsaturated polyester.

The polymers modified according to the invention generally have molecular weights ranging from about 400 to 20,000, preferably from about 500 to 10,000 and most often from about 500 to 7,000.

The preferred polymers modified according to the invention, as defined hereinabove, allow simultaneous improvement of the chill point and the flow point of petroleum middle distillates, which makes them particularly attractive to the refiner. The additives are obtained in solution in the solvent chosen and can be directly used in this form in petroleum middle distillates (for example, in gas oils) whose flow point is to be improved. In order to observe clear simultaneous improvement in the chill point and the flow point of the gas oil cuts contemplated in the invention and defined hereinafter, it is necessary to add these additives at concentrations, for example, from 0.001 to 2% in weight, preferably from 0.01 to 1% in weight and more advantageously from 0.02 to 0.3% in weight.

The gas oil compositions according to the invention comprise a major proportion of petroleum middle distillate having a distillatoin range according to the ASTM D 8667 distillation norm between 150° and 450° C. (fueloils, gas oils) and a minor proprtion, sufficient for simultaneous decrease in the chill point and the flow point, of at least one modified polymer defined hereinabove.

The gas oils contemplated in particular have a distillation range from an initial temperature of about 160° to 190° C. to a final temperature of about 360° to 430° C.

Gas oil compositions comprising a major proportion of middle distillate and at least one additive chosen from the polymers modified according to the invention, defined hereinabove, in a quantity sufficient for simultaneous decrease in the chill point and the flow point, can also comprise other additives such as antioxidant additives, sludge dispersants, corrosion inhibitors, etc . . . .

The compositions usually comprise at least 95% and preferably at least 98% in weight of middle distillate.

The decrease in the flow point can be, for example, up to 24° C. or more. Furthermore, it is possible to observe a simultaneous decrease in the chill point which can be, for example, up to 3° C. or more.

The modified polymers used in the invention allow, due to their action on the kinetic phenomena of crystallization, of paraffins in particular, and by modification of the size of the crystals formed, use of the suspension at a lower temperature without obstruction of pipes or clogging of filters. When paraffin crystals appear, whose formation is provoked by cooling. their natural tendency is to gather in the lower part of pipes due to gravity. This phenomenon, known as sedimentation, leads to obstruction of pipes and clogging of filters and is prejudicial to use of middle distillates, gas oils and domestic fuels in particular, at low temperatures. The modified polymers of the invention decrease the sedimentation rate of paraffins formed by cooling of gas oils and other middle distillates; the paraffins, remaining in suspension longer, settle less on the sides of pipes in contact with the gas oils and other middle distillates, thus slowing down obstruction of said pipes and allowing a product of given characteristics to be used at a much lower temperature or to use a product at a given temperature, a product which, obtained by the refiner without modification of the distillation chart, does not initially have the required specifications; specifications which are at present becoming stricter.

The following examples illustrate the invention without in any way limiting its scope.

In the examples, the gas oil cuts used are those given in table II. They are characterized according to the ASTM D 8667 distillation norm. These gas oil cuts of ARAMCO origin are designated $G_1$ and $G_2$; their densities are also given in table II.

Two determinations are carried out for $G_1$ and $G_2$ cuts without additives and for compositions containing an additive:

the chill point, according to the ASTM D 2500-66 norm the flow point, according to the ASTM D97-66 norm.

TABLE II

| Gas oils | ASTM distillation | | % distilled at 350° C. | Density at 15° C. in kg/l |
|---|---|---|---|---|
| | Pi °C. | Pf °C. | | |
| $G_1$ | 189 | 373 | 95 | 0.844 |
| $G_2$ | 177 | 373 | 92 | 0.836 |

EXAMPLE 1 (comparative)

14.7 g (0.15 mole) of maleic anhydride, 50.6 g (0.15 molar equivalent) of epoxy octadecane at 4.75% weight of oxygen and 17.6 g of xylene are introduced into a 250-ml reactor equipped with a cooler and a stirring system. The temperature is brought to 60° C., 3.82 g of n-butyl titanate are introduced and the mixture is maintained at this temperature for 5 hours, with continuous stirring. An unsaturated polyester in the form of a yellow product is obtained, which can be characterized using conventional analysis methods: its IR spectrum shows the disappearance of maleic anhydride bands at 1850 cm$^{-1}$ and 1780 cm$^{-1}$ and the appearance of a strong ester band at 1720 cm$^{-1}$. Its average molecular weight is 2,700 and its polydispersal is 1.67 (measured with Steric Exclusion Chromatography). The polymer obtained is diluted to 50% in weight in xylene. This solution constitutes additive A stock solution.

EXAMPLE 2 a) The same solution in xylene of the same polyester described in example 1 is prepared in the same way as in example 1.

b) 10.7 g (0.0374 mole) of octadecanethiol and 15 g of xylene are added to a reactor containing 20 g of solution of unsaturated polyester dissolved in xylene (obtained in step (a)). The temperature of the mixture is brought to 60° C. and 0.21 g of triethylamine (1.8.10$^{-3}$ mole) is introduced. This mixture is then maintained at 60° C. for 4 hours, with continuous stirring. The reaction is followed with infrared spectrometry and disappearance of the band at 1640 cm$^{-1}$ corresponding to the ethylenic unsaturation of the polymer is observed. Addition of n-octadecanethiol is confirmed by analysis of the nuclear magnetic resonance spectrum of the product obtained. Excess additives are eliminated. The solution obtained is diluted in xylene such that a solution at 50% in weight of product is obtained. This constitutes additive I stock solution. The average molecular weight of additive I, measured with Steric Exclusion Chromatography, is 4,200.

EXAMPLES 3 to 5

An unsaturated polyester is prepared according to example 1 and addition of this unsaturated polyester to various mercaptans is carried, out according to the operating procedure described in example 2(b) and respecting the molar proportions given in example 2(b).

EXAMPLE 3

The mercaptan used is n-dodecyl mercaptan. The product obtained in solution in xylene constitutes a solution of additive II. Additive II has an average molecular weight of 3,000 (measured with Steric Exclusion Chromatography).

EXAMPLE 4

The mercaptan used is n-tetradecyl mercaptan. The product obtained in solution in xylene constitutes a solution of additive III. Additive III has an average molecular weight of 4,000.

EXAMPLE 5

The mercaptan used is n-hexadecyl mercaptan. The product obtained in solution in xylene constitutes a solution of additive IV.

EXAMPLE 6

To an aliquot of unsaturated polyester stock solution, obtained according to the operating procedure described in example 1, addition of an equimolar mixture of n-dodecylmercaptan and n-octadecylmercaptan is carried out according to the operating procedure described in example 2(b) and respecting the molar proportions given in example 2(b). The product obtained in solution in xylene constitutes a solution of additive V.

The additives described hereinabove are obtained in solution in xylene. The concentration of the solution is adjusted to 50% in weight of dry matter, which gives stock solution of these additives whose activity is tested by incorporating them at a proportion of 0.05% in weight with respect to the gas oil whose characteristics were given in table II hereinabove. The results of these determinations are grouped together in table III hereinafter. They clearly show simultaneous improvement in the chill point and the flow point which allow us to obtain the modified polymers according to the invention with respect to a gas oil without an additive.

These results also show that the modified polymers according to the invention lead to an improvement in the chill point of gas oils, contrary to the unmodified unsaturated polyester (A) (comparative example), as well as leading to a great improvement, sometimes greater than that obtained with the unmodified unsaturated polyester, in the flow point of gas oils.

TABLE III

| Additives % weight | Chill point (°C.) G1 | Chill point (°C.) G2 | Flow point (°C.) G1 | Flow point (°C.) G2 |
|---|---|---|---|---|
| nil | −1 | −2 | −9 | −9 |
| 0.05% A | −1 | −2 | −18 | −18 |
| 0.05% I | −4 | −5 | −12 | −15 |
| 0.05% II | −3 | −3 | −27 | −33 |
| 0.05% III | −3 | −4 | −15 | −27 |
| 0.05% IV | −4 | −4 | −12 | −15 |
| 0.05% V | −4 | −4 | −12 | −15 |

What is claimed is:

1. A petroleum middle distillate composition comprising a major proportion of middle distillate having a distillation range between 150° and 450° C. and a minor proportion, sufficient for simultaneous decrease in the chill point and flow point, of at least one polymer of average molecular weight of 400 to 20,000 having thiosubstituted groups, and resulting from the reaction, in the presence of an addition catalyst, of at least one compound with a thiol function having one of the general formulae:

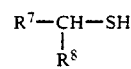  (I)

or $HS-CH_2-(R^9)_n-COOR^{10}$  (II)

in which $R^7$ represents a hydrogen atom or an alkyl group having 1 to 59 carbon atoms, $R^8$ represents a hydrogen atom or a lower alkyl group, $R^9$ represents an alkylene group having 1 to 57 carbon atoms, n is zero or one and $R^{10}$ represents an alkyl group having 1 to 58 carbon atoms, with an unsaturated polyester resulting from the condensation of at least one unsaturated dicarboxylic compound having at least one ethylenic unsaturation in the alpha position of one of the carboxyl groups with at least one aliphatic epoxidated compound having 2 to 62 carbon atoms in its molecule, the epoxidated compound/dicarboxylic compound molar ratio being about 0.4:1 to 1.8:1, and the compound with a thiol function/dicarboxylic compound molar ratio being about 0.2:1 to 1.5:1.

2. A composition according to claim 1 wherein the dicarboxylic compound is chosen from the anhydrides of mono-unsaturated dicarboxylic acids having 4 to 8 carbon atoms in their molecule.

3. A composition according to claim 1 wherein the epoxidated aliphatic compound is a monoepoxidated compound of formula

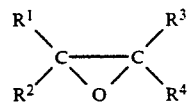

in which $R^1$ and $R^3$, identical or different, each represent a hydrogen atom or a lower alkyl group, $R^2$ and $R^4$ each represent a hydrogen atom, an alkyl group having 1 to 60 carbon atoms, an alkoxyalkyl group of formula $R^5-O-R^6-$ in which $R^5$ represents an alkyl group having 1 to 59 carbon atoms and $R^6$ represents an alkylene group having 1 to 59 carbon atoms, $R^2$ also possibly representing an alkoxycarbonylalkylene group of formula

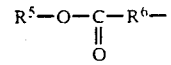

or an alkylcarbonyloxyalkylene group of formula

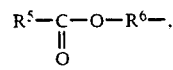

in which $R^5$ and $R^6$ each have the definition given hereinabove.

4. A composition according to claim 1, wherein the aliphatic epoxidated compound is a substantially linear monoepoxyalkane.

5. A composition according to claim 1, wherein the epoxidated compound is a compound of formula:

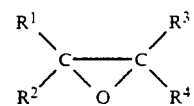

in which $R^1$ and $R^3$ represent a hydrogen atom, $R^4$ is a hydrogen atom or a substantially linear alkyl group having 1 to 60 carbon atoms and $R^2$ is an alkoxycarbonylalkylene group of formula

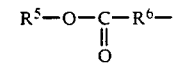

in which $R^5$ is a substantially linear alkyl group and $R^6$ a substantially linear alkylene group.

6. A composition according to claim 1, wherein the compound with a thiol function is a substantially linear alkylthiol having 5 to 35 carbon atoms in its molecule.

7. A composition according to claim 1, wherein the compound with a thiol function is an alkyl ester of thioglycolic acid.

8. A composition according to claim 1, wherein the thiol compound comprises 6 to 25 carbon atoms in its molecule.

9. A composition according to claim 1, said polymer comprising substantially linear side chains having at least 8 carbon atoms.

10. A middle distillate composition according to claim 9 wherein the middle ditillate is a gas oil cut having a distillation range from an initial temperature of about 160° to 190° C. to a final temperature of about 360° to 430° C.

11. A middle distillate composition according to claim 9, wherein the proportion of polymer is from 0.001 to 2% in weight.

12. A method of decreasing the flow point or chill point of a middle distillate, comprising adding to said middle distillate an effective amount of a polymer of average molecular weight of 400 to 20,000 having thiosubstituted groups, and resulting from the reaction, in the presence of an addition catalyst, of at least one compound with a thiol function having one of the general formulae:

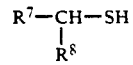

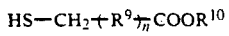

in which $R^7$ represents a hydrogen atom or an alkyl group having 1 to 59 carbon atoms, $R^8$ represents a hydrogen atom or a lower alkyl group, $R^9$ represents an alkylene group having 1 to 57 carbon atoms, n is zero or one and $R^{10}$ represents an alkyl group having 1 to 58 carbon atoms, with an unsaturated polyester resulting from the condensation of at least one unsaturated dicarboxylic compound having at least one ethylenic unsaturation in the alpha position of one of the carboxyl groups with at least one aliphatic epoxidated compound having 2 to 62 carbon atoms in its molecule, the epoxidated compound/dicarboxylic compound molar ratio being about 0.4:1 to 1.8:1, and the compound with a thiol function/dicarboxylic compound molar ratio being about 0.2:1 to 1.5:1.

13. A method according to claim 12, wherein said middle distillate has a distillation range of 150° to 450° C.

14. A method of decreasing the flow point and chill point of a middle distillate, comprising adding to said middle distillate an effective amount of a polymer of average molecular weight of 400 to 20,000 having thiosubstituted groups, and resulting from the reaction, in the presence of an addition catalyst, of at least one compound with a thiol function having one of the general formulae:

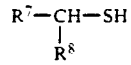

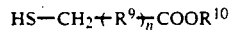

in which $R^7$ represents a hydrogen atom or an alkyl group having 1 to 59 carbon atoms, $R^8$ represents a hydrogen atom or a lower alkyl group. $R^9$ represents an alkylene group having 1 to 57 carbon atoms, n is zero or one and $R^{10}$ represents an alkyl group having 1 to 58 carbon atoms, with an unsaturated polyester resulting from the condensation of at least one unsaturated dicarboxylic compound having at least one ethylenic unsaturation in the alpha position of one of the carboxyl groups with at least one aliphatic epoxidated compound having 2 to 62 carbon atoms in its molecule, the epoxidated compound/dicarboxylic compound molar ratio being about 0.4:1 to 1.8:1, and the compound with a thiol function/dicarboxylic compound molar ratio being about 0.2:1 to 1.5:1.

15. A petroleum middle distillate composition comprising a major proportion of middle distillate having a distillation range between 150° and 450° C. and a minor proportion, sufficient for simultaneous decrease in the chill point and flow point, of at least one polymer of average molecular weight of 400 to 20,000, said polymer having thiosubstituted groups, and resulting from the reaction, in the presence of an addition catalyst, of (1) at least one compound with a thiol function having one of the general formulae:

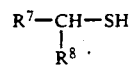

wherein $R^7$ represents a hydrogen atom or an alkyl group having 1 to 59 carbon atoms, $R^8$ represents a hydrogen atom or a lower alkyl group, $R^9$ represents an alkylene group having 1 to 57 carbon atoms, n is zero or one and $R^{10}$ represents an alkyl group having 1 to 58 carbon atoms, with (2) an unsaturated polyester resulting from the condensation of (a) at least one unsaturated dicarboxylic compound having at least one ethylenic unsaturation in the alpha position of one of the carboxyl groups with (b) at least one aliphatic epoxidated compound.

* * * * *